United States Patent [19]

Valassis et al.

[11] 3,959,775

[45] May 25, 1976

[54] MULTIPROCESSING SYSTEM IMPLEMENTED WITH MICROPROCESSORS

[75] Inventors: John G. Valassis, Des Plaines; James R. Holden, Chicago, both of Ill.

[73] Assignee: GTE Automatic Electric Laboratories Incorporated, Northlake, Ill.

[22] Filed: Aug. 5, 1974

[21] Appl. No.: 494,446

[52] U.S. Cl. ............................................. 340/172.5
[51] Int. Cl.² ......................................... G06F 15/16
[58] Field of Search ...................... 340/172.5; 445/1

[56] References Cited
UNITED STATES PATENTS

| | | | |
|---|---|---|---|
| 3,242,467 | 3/1966 | Lamy | 340/172.5 |
| 3,445,822 | 5/1969 | Driscoll et al. | 340/172.5 |
| 3,648,252 | 3/1972 | Thron et al. | 340/172.5 |
| 3,676,860 | 7/1972 | Collier et al. | 340/172.5 |
| 3,713,107 | 1/1973 | Barsamian | 340/172.5 |
| 3,761,879 | 9/1973 | Brandsma et al. | 340/172.5 |

*Primary Examiner*—Mark E. Nusbaum

[57] ABSTRACT

A bus assigner in an electronic data processing system for selectively assigning access to a system bus to one of a plurality of microprocessors comprising a multiprocessing system. In an embodiment of the present invention, logic circuitry is provided for assigning a priority of operation to each of the microprocessors, each microprocessor having a different assigned priority. The bus assigner selectively assigns access to the system bus to the microprocessor having the highest priority whenever one or more of the microprocessors requests access to the system bus. In an alternative embodiment, the bus assigner sequentially scans the microprocessors for requests for access to the system bus and assigns access to the system bus in the order in which the requests are received by the bus assigner as it scans the microprocessors.

4 Claims, 9 Drawing Figures

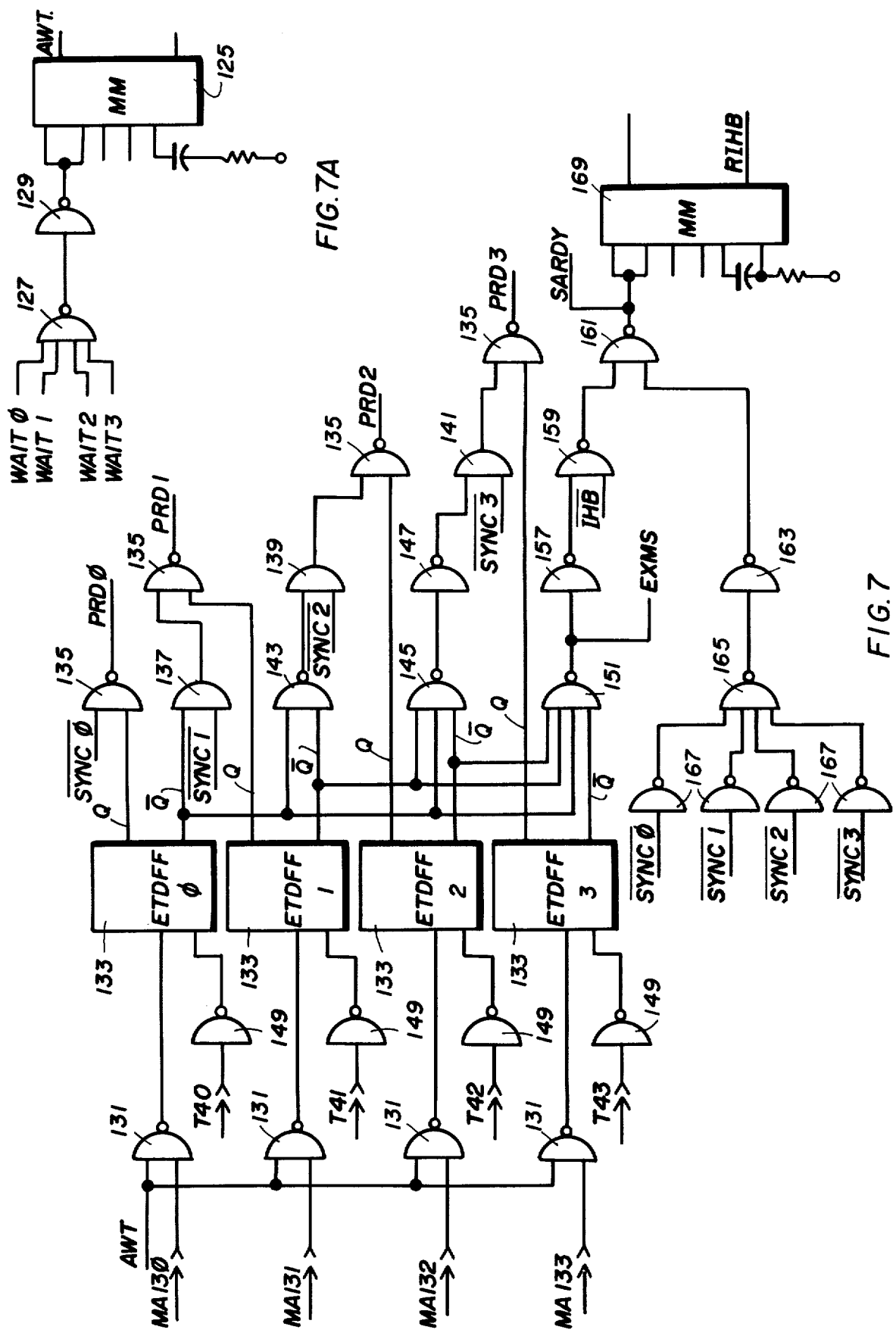

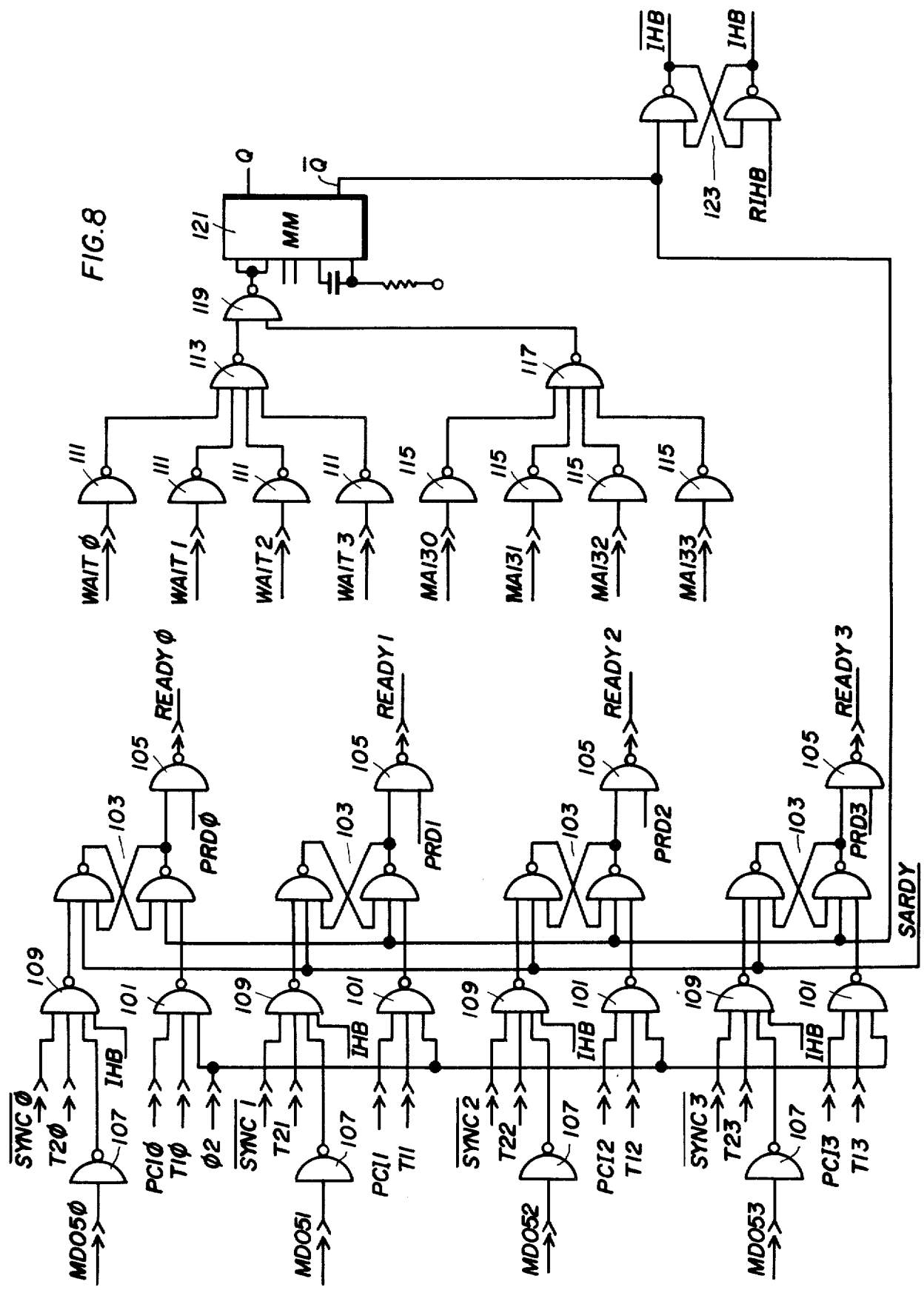

MULTIPROCESSING SYSTEM IMPLEMENTED WITH MICROPROCESSORS

BACKGROUND OF THE INVENTION

This invention relates generally to an expandable modular control system incorporating multiprocessing systems comprising a plurality of autonomous microprocessor modules linked by a system bus to a common external memory and more particularly to a bus assigner for assigning use of the system bus on a priority basis to the microprocessor having the highest priority or, alternatively, on a sequential basis to the several microprocessors as the bus assigner scans the microprocessors for a request for access to the external memory.

Reference may be made to the following U.S. Pat. Nos. 3,629,854; 3,641,505; 3,648,252; and 3,680,058.

Electronic data processing systems are utilized for a wide variety of different data processing activities, each of these activities having different systems requirements. Therefore, large amounts of storage, processing and input/output capabilities are generally required in real time control systems. Accordingly, multiprocessing systems wherein each of the several central processing units (CPUs) comprising the system shares a common memory and peripheral input/output devices with the other CPUs have been devised to more economically meet these requirements.

In these prior art multiprocessing systems, however, one CPU generally functions as a "master" processor for processing a master control program to, in turn, control the operations of the other "slave" processing units. In such an arrangement, the master CPU performs all executive functions while the remaining processors serve as peripheral extensions of the master processor unit. This arrangement, however, requires large amounts of time and memory capacity to keep all of the multiprocessing activities coordinated.

Moreover, it has become increasingly desirable to provide modular multiprocessing systems comprising a plurality of processing modules whereby the system can be expanded merely by adding additional modules. If the system is to be truly modular, however, the hardware implementation of each processor module should be identical so that each processor is capable of functioning independently of the other processors and not subject to the control of a master processor.

With the recent development of "CPU-on-a-chip" devices, or microprocessors, as they are more commonly known, employing primarily software (programming) rather than hardware (wired logic circuitry) in processing data, a new generation of data processing systems has evolved. One such system, used in monitoring telephone circuitry, is disclosed in the copending U.S. pat. application, Ser. No. 474,570 of J. G. Valassis, J. R. Holden and M. A. Mehta filed May 30, 1974, entitled "Modular Control System Designed With Microprocessors" and assigned to the assignee of the present invention. The microprocessor module disclosed therein is readily adaptable to a multiprocessing arrangement employing a plurality of such microprocessor modules linked to a common external memory.

However, some means for coordinating access to the external memory and other peripheral devices by the various microprocessors must be provided to facilitate the efficient operation of the multiprocessing arrangement.

SUMMARY OF THE INVENTION

In accordance with the present invention, an electronic data processing system incorporating a multiprocessing arrangement comprising a plurality of autonomous microprocessors and bus assigner means is provided for processing data.

In an embodiment of the invention, the electronic data processing system comprises an expandable modular control system including an external memory module for storing data and multiprocessing means comprising a plurality of microprocessor modules for processing the data. One or more input/output (I/O) interface modules having corresponding input/output (I/O) devices associated therewith are also provided for inputting data to the multiprocessor and outputing processed data therefrom. Sense point and control point modules, each comprising an array of memory devices corresponding to a plurality of n-bits words having corresponding memory addresses associated therewith, respectively monitor the controlled system and apply control signals from the microprocessor module, control words from the microprocessor module being loaded into the control point module memory array to control the controlled system. Bus means are provided including an extended external memory address bus and a pair of extended external data transfer buses intercoupling the multiprocessor with the external memory module and the sense point and control point modules for respectively addressing a particular memory address in the memory module and the sense point and control point modules and for transferring data between the memory address and the multiprocessor.

In the electronic data processing system generally or in the expanded modular control system specifically, bus assigner means are also provided for selectively assigning access to the bus means to the microprocessors. The bus assigner means assigns the system bus means to the microprocessor having the highest priority whenever one or more of the microprocessors request access to the external memory, each microprocessor having a different priority assigned to it by logic means.

In an alternative embodiment, the bus assigner means sequentially scans the microprocessors for requests for access to the external memory and assigns access to the bus means in the order in which said requests are received as said bus assigner scans said microprocessors.

BRIEF DESCRIPTION OF THE DRAWINGS

The invention may be best understood, however, by reference now to the following description taken in conjunction with the accompanying drawings, in which like reference numerals identify like elements in the several figures and in which:

FIG. 3 illustrates in greater detail the sense point module of the expandable modular control system shown in FIG. 1;

FIG. 7 is a schematic diagram showing novel bus assigner means in accordance with the present invention for assigning access to the system bus on a priority basis;

FIG. 7A is a schematic diagram further illustrating part of the novel bus assigner means in conjunction with FIG. 7; and FIG. 8 is a schematic diagram further illustrating part of the novel bus assigner means in conjunction with FIGS. 7 and 7A.

DETAILED DESCRIPTION

In accordance with the present invention, there is hereinafter shown and described an expandable modular control system incorporating a multiprocessing system comprising a plurality of autonomous microprocessor modules which are linked to a common memory module by a system bus.

In particular, the modular multiprocessing system comprises a plurality of universal microprocessor modules, each module comprising, for example, a printed circuit card with one or more microprocessor devices mounted thereon. These and other separately packaged peripheral support modules or printed circuit cards, such as an external memory module, sense point and control point modules, and input/output (I/O) interface modules, comprise a "library" of functional building blocks which can be selectively combined to implement virtually any modular control system or other electronic data processing system that may be required.

The multiprocessing system further includes a novel bus assigner module for interconnecting the several microprocessor modules with the peripheral support modules, e.g., the external memory module, via the system bus to selectively transfer data between the various modules in accordance with the microprocessor programs controlling the data processing operations of the system.

In one embodiment of the present invention hereinafter shown and described, the bus assigner assigns use of the system bus on a priority basis to the microprocessor module having the highest priority of operation. In an alternative embodiment, the bus assigner assigns access to the system bus on a sequential basis to the several microprocessors as the bus assigner scans the microprocessors for a request for access.

Figure 1:
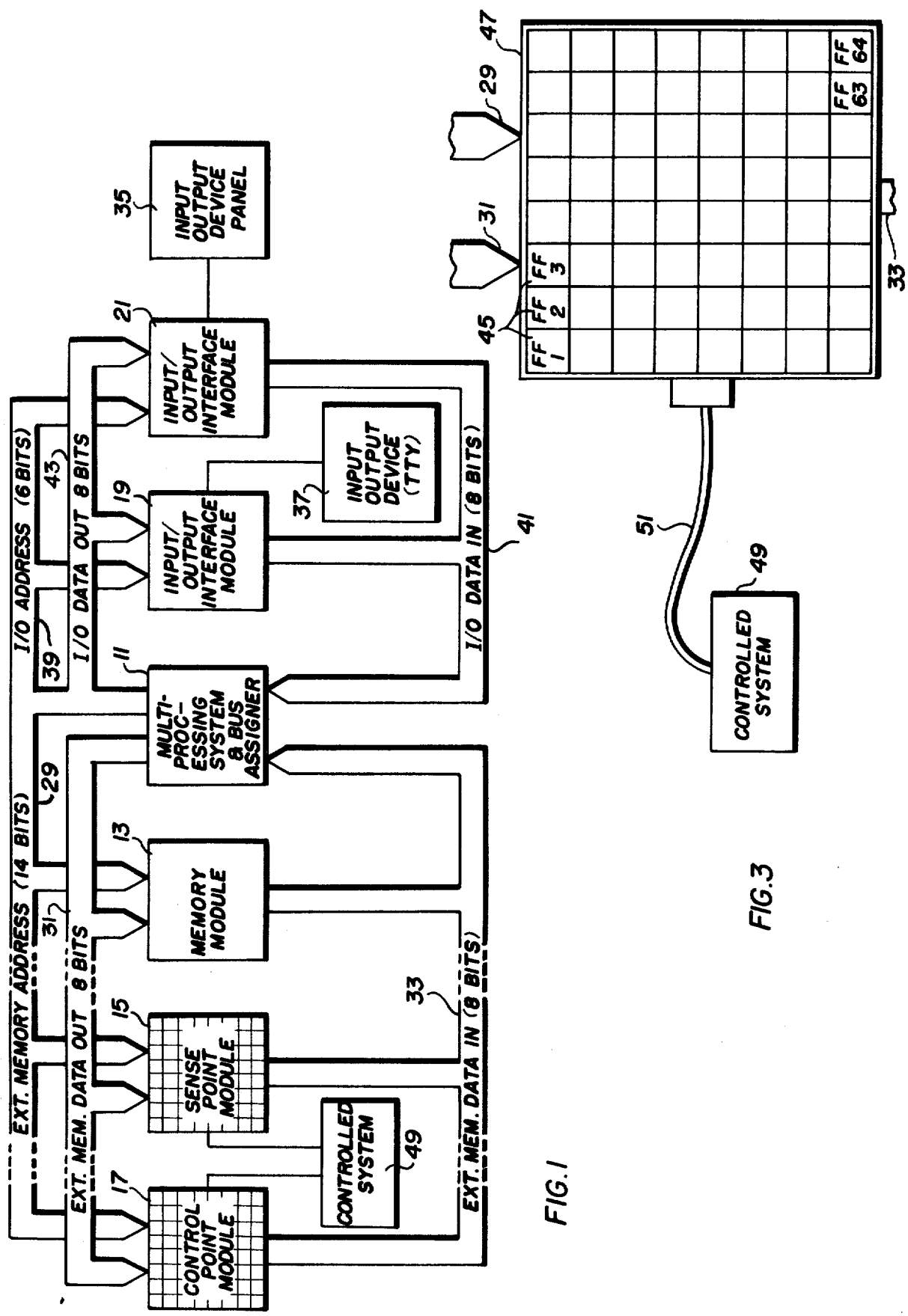
FIG. 1 is a block diagram showing an expandable modular control system incorporating a multiprocessing system comprising a plurality of microprocessors and novel bus assigner means in accordance with the present invention.
Figure 2:
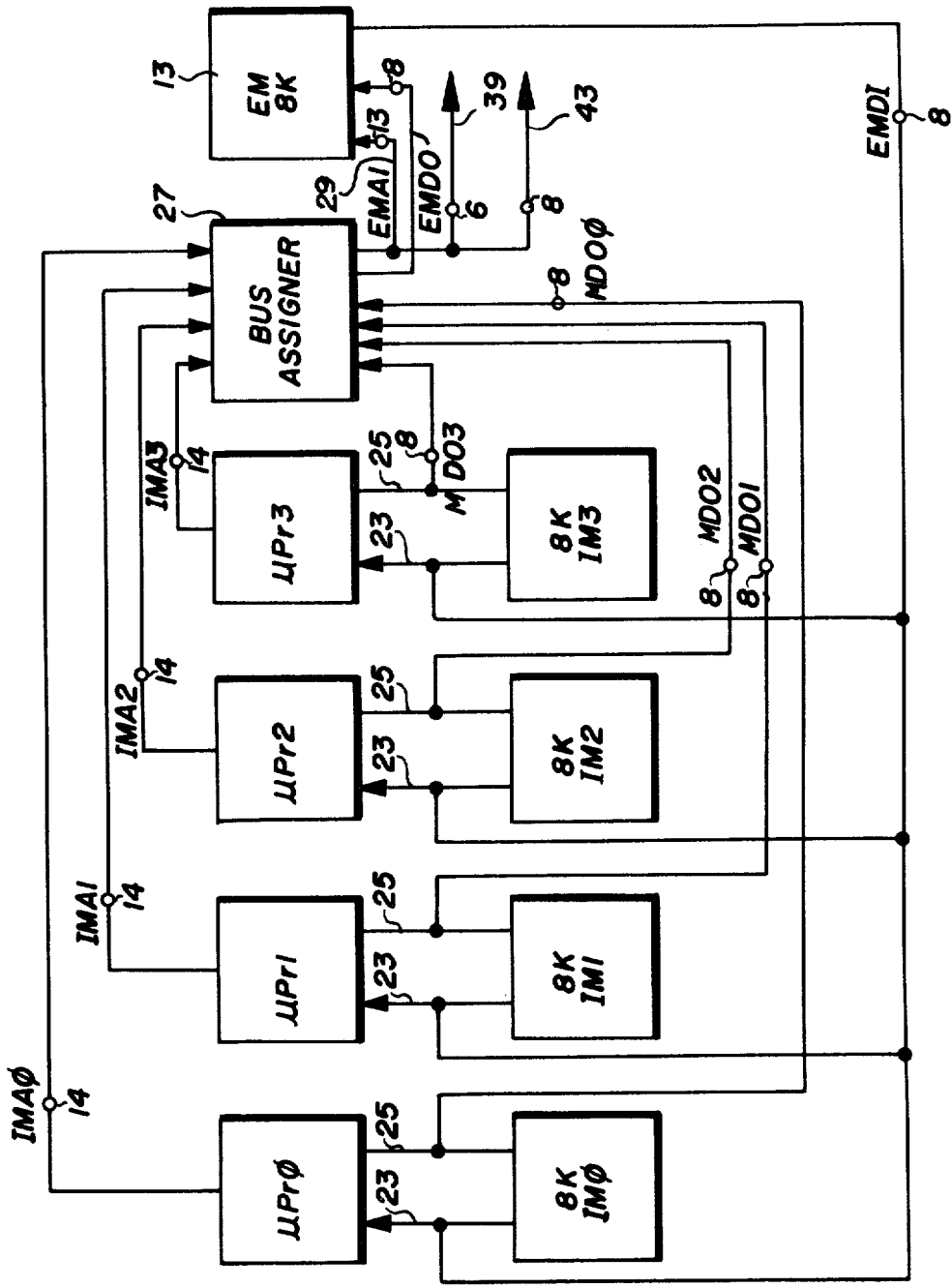
FIG. 2 is a block diagram illustrating in greater detail the interconnection of the multiprocessing system and the bus assigner means of the present invention.

Referring now to FIGS. 1 and 2, it may be seen that the modular control system illustrated therein comprises a multiprocessing system 11, including bus assigner means, interconnected via a system busing arrangement with an external memory module 13, sense point and control point modules, 16 and 17, respectively, and a pair of input/output (I/O) interface modules, 19 and 21.

It should be understood, however, that the particular embodiment shown in FIG. 1 is only by way of example and should not be construed to be the only possible embodiment. Many different control systems and other electronic data processing systems can, in fact, be effected by selectively combining the various modules required for a particular application.

The multiprocessing system, which is illustrated in greater detail in FIG. 2, comprises a plurality of autonomous microprocessor modules and corresponding internal memories associated therewith. Although any number of microprocessors (and associated internal memories) can be incorporated in the multiprocessing system, to simplify the description thereof, it will be assumed that the multiprocessor 11 comprises four microprocessor modules, $\mu Pr0$, $\mu Pr1$, $\mu Pr2$, and $\mu Pr3$, and their associated internal memories, IM0, IM1, IM2 and IM3.

Corresponding pairs of internal data transfer buses, 23 and 25, respectively, interconnect each microprocessor with its associated internal memory to transmit 8-bit data words therebetween as required by the microprocessor. The designation "internal" is used herein to identify component modules and buses internal to and comprising the multiprocessing means while the designation "external" refers to component modules and buses external to the multiprocessing system. Since each internal memory is associated with one particular microprocessor, access to a particular internal memory by the corresponding microprocessor is unrestricted. Accordingly, each microprocessor is able to execute its control program independently of the other microprocessors.

Each of the microprocessors ($\mu Pr0$, $\mu Pr1$, $\mu Pr2$ and $\mu Pr3$) is linked to the common external memory module 13 by a bus assigner 27 which controls access of the several microprocessors to the external memory 13. Specifically, the bus assigner 27 permits only one microprocessor to access the external memory 13 at any particular time to read or write data. That is, if simultaneous requests are being made by more than one microprocessor, the bus assigner 27 assigns the system bus linking the multiprocessing system 11 and the external memory module 13 to only one of the microprocessors, delaying access by the other microprocessors until the first microprocessor has completed its turn. Accordingly, although each of the microprocessors functions independently of the other microprocessors, i.e., is autonomous, the data processing operations of the microprocessors are coordinated.

More particularly, each microprocessor ($\mu Pr0$, $\mu Pr1$, $\mu Pr2$ and $\mu Pr3$) is coupled to the bus assigner 27 by a corresponding 14-bit Internal Memory Address bus (IMA0, IMA1, IMA2 and IMA3, respectively) and a corresponding 8-bit Internal Data Out bus (MDO0, MDO1, MDO2 and MDO3, respectively). Whenever a particular microprocessor needs access to the external memory module 13, it generates a 14-bit memory address corresponding to the address of a particular memory location in the external memory 13. The 14-bit memory address is coupled to the bus assigner 27 over the corresponding Internal Memory Address bus.

As shown in FIGS. 1 and 2, the system busing arrangement includes an External Memory Address bus 29 coupling the bus assigner 27 to the external memory module 13. If one or more of the microprocessors is seeking access to the external memory 13, the bus assigner 27 selectively couples the corresponding 14-bit memory addresses one at a time from the microprocessor(s) to the external memory 13 to address a particular memory location therein.

If data is to be written into the external memory 13 from one of the microprocessors ($\mu Pr0$, $\mu Pr1$, $\mu Pr2$ and/or μPr3) or its associated internal memory (IM0, IM1, IM2, IM3), the data is coupled in the form of 8-bit words to the bus assigner 27 over the Data Out bus (MDO0, MDO1, MDO2 and MDO3) coupled to the internal data transfer bus 25 of the corresponding microprocessor. The bus assigner 27 multiplexes the data output from the several microprocessors over the corresponding Data Out buses so that only that data from the microprocessor having access to the external memory 13 is coupled from the bus assigner 27 to memory 13 via an 8-bit External Memory Data Out bus 31.

If, on the other hand, data is to be read from the external memory module 13 and coupled to a particular microprocessor, the 8-bit data words are coupled over an External Memory Data In bus 33 from the external memory 13 to the corresponding internal data transfer bus 23 of the microprocessor given access to the memory 13 by the bus assigner 27.

In accordance with one embodiment of the present invention, the bus assigner 27 selectively assigns the system bus, e.g., the External Memory Address bus 29 and the External Memory Data Out bus 31, to the microprocessors on a priority basis. That is, when the bus assigner 27 acknowledges a request for access to the external memory module 13 by a particular microprocessor, the assigner 27 checks whether simultaneous access requests are being made by any of the other microprocessors. If two or more microprocessors seek simultaneous access, the bus assigner 27 assigns the system bus to the microprocessor having the highest priority, priority between the microprocessors being determined by a hardware option. At the end of the memory access by the requesting microprocessor having priority, access to the external memory 13 is given to the microprocessor having the next highest priority, and so on.

In an alternative embodiment, the bus assigner 27 assigns the system bus to the microprocessors on a sequential basis. In that embodiment, the bus assigner 27 scans the four microprocessors (μPr0, μPr1, μPr2 and μPr3) sequentially for a request for access to the external memory 13. If the bus assigner 27 determines during scanning that a particular microprocessor requires access to the external memory 13, the bus assigner 27 assigns the system bus to the requesting microprocessor for one memory transfer. At the end of the memory transfer, the bus assigner 27 continues to sequentially scan the other microprocessors for requests for access to the external memory 13.

The expandable modular control system illustrated in FIG. 1 further includes peripheral input/output (I/O) devices such as, for example, a display panel 35, a teletypewriter (TTY) 37 and the like which provide means for inputing data to the multiprocessing system 11 and receiving processed data or information therefrom. It should be understood that a wide variety of input/output (I/O) devices are available, each having unique interfacing requirements which must be satisfied if the I/O device is to be operationally compatible with the modular control system of the present invention. Accordingly, corresponding input/output (I/O) interface modules are provided to interface the I/O devices with the control system. Specifically, in the present embodiment, I/O interface module 19 couples the teletypewriter 37 to the remainder of the control system while I/O interface module 21 interfaces the display panel 35. These I/O interface modules function to synchronize the differing operating speeds of their respective associated I/O devices to the microprocessors comprising multiprocessor 11. Further, the I/O interface modules translate the input data coupled thereto from the corresponding I/O device to a machine-language binary code compatible for processing by the microprocessors.

A 6-bit Input/Output (I/O) Address bus 39, which is an extension or branch of the External Memory Address bus 29, couples the bus assigner 27 and hence the microprocessors comprising multiprocessor 11 to the I/O interface modules, 19 and 21, and provides a means for addressing a particular I/O device with a corresponding 6-bit address transmitted thereto via the I/O Address bus 39. The 6-bit I/O address permits the addressing of up to 24 I/O devices in the output mode whereby processed data and information is output to the particular I/O device addressed and up to 8 I/O devices in the output mode whereby raw data is obtained from the particular I/O device addressed.

When the I/O address is transmitted, the information to be input or output, as the case may be, is then transferred between the particular microprocessor having access and the addressed I/O device via a data bus and the particular I/O interface module corresponding to the I/O device addressed. More particularly, the input data from a particular I/O device is converted into a sequential plurality of 8-bit words by the corresponding I/O interface circuit and coupled via an Input/Output (I/O) Data In bus 41, which is an extension or branch of the External Memory Data In bus 33, to the particular microprocessor having access. In like manner, processed data or other information can be transferred from the multiprocessor 11 to a particular I/O device over the 8-bit Input/Output (I/O) Data Out bus 43, which is also an extension or branch of bus 29 coupled to the corresponding I/O interface module.

The sense point module 15 and the control point module 17 are included to respectively monitor certain selected parameters of the system being supervised by the control system and to apply control signals to the controlled system in response thereto under the direction of the control system. In addition, the sense point and control point modules, 15 and 17, respectively, function as extensions of the external memory module 13 thereby reducing the storage capacity required of the external memory module 13 and the cost associated therewith.

This may be more clearly understood by reference now to FIG. 3 wherein the sense point module 15 is shown in greater detail. There it may be seen that the sense point module 15 comprises a plurality of flip-flops 45 arranged in a matrix array on a printed circuit card 47. In the present embodiment, for example, 64 flip-flops 45 are arranged in an 8-by-8 matrix. Since the flip-flops 45 are bistable devices which can be set and reset between two stable states, the 8-by-8 array is functionally similar to the array of memory elements comprising the external memory module 13. Accordingly, the sense point flip-flop matrix serves as a separate 8-word-by-8-bit extension of the external memory module 13, each 8-bit word in the sense point module 15 corresponding to a particular 14-bit memory address.

The flip-flops 45 comprising the sense point module 15 are also coupled to the system being controlled by the modular control system, i.e., controlled system 49, to monitor certain assigned parameters therein. For example, in a telephone communications system, the sense point module 15 may be used to monitor the "on/off hook" status of a plurality of telephones coupled to the system. Access to the relays and other electromechanical equipment comprising the telephone system may be obtained through a cable connector arrangement 51 coupled to the sense point module card 47. Appropriate connections (not shown) may then be made between the connector arrangement 51 and the flip-flops 45 so that the data coupled to the sense point module 15 can be stored, i.e., registered, in the flip-flop matrix as a plurality of 8-bit words, each having a particular 14-bit memory address associated therewith.

Similarly, the control point module 17 also comprises a matrix array of flip-flops arranged to correspond to a plurality of 8-bit words. While the word capacity of the control point module 17 may differ from that of the sense point module 15, depending upon the requirements of the controlled system 49, the control point module 17 is substantially identical to the sense point module 15 in every other respect. The only other limitations placed on modules 15 and 17 are that the word length (8-bits in the present embodiment) must be compatible for processing by the microprocessor device, and each word must have a unique memory address associated therewith.

In FIG 1, it may be seen that the External Memory Address bus 29 to the external memory module 13 is extended to also couple the sense point module 15 and the control point module 17 to the multiprocessor 11. Accordingly, the particular microprocessor having access to the system bus is able, responsive to its control program, to selectively address the sense point module 15 by coupling the 14-bit memory address corresponding to the particular word location wherein the monitored data is stored to the sense point module 15 via the extended External Memory Address bus 29. The data "read" from the sense point module 15 is then transmitted to the microprocessor via an extension of the External Memory Data In bus 33 where it is processed by the microprocessor in accordance with the control program.

After processing the retrieved data, the microprocessor may again have access to the system bus for issuing control decisions or commands to the control point module 17 in the form of one or more 8-bit "control" words. The particular word location in the control point module 17 where the control word is stored is determined by a 14-bit memory address coupled to the control point module 17 via the bus assigner 27 and the extended External Memory Address bus 29. The control word is then transferred to control point module 17 by means of an extension of the 8-bit External Memory Data Out bus 31 and loaded into the corresponding word location, i.e., flip-flops 45. Accordingly, the control point module 17 is then effective to control the controlled system 51 responsive to the control words issued by the multiprocessor 11 in response to the monitored data.

Although the sense point and control point modules, 15 and 17, respectively, have been described as comprising an 8-word-by-8-bit flip-flop matrix array, it will be apparent to one skilled in the art that such an arrangement is for illustrative purposes only and that other similar arrangements are equally well suited for this purpose. It should be further understood that the expandable multiprocessing modular control system of the present invention is not necessarily limited to use with telephone communication systems, but can be adapted to any system wherein certain system parameters are to be monitored to control the system in accordance with a control program.

Figure 4:
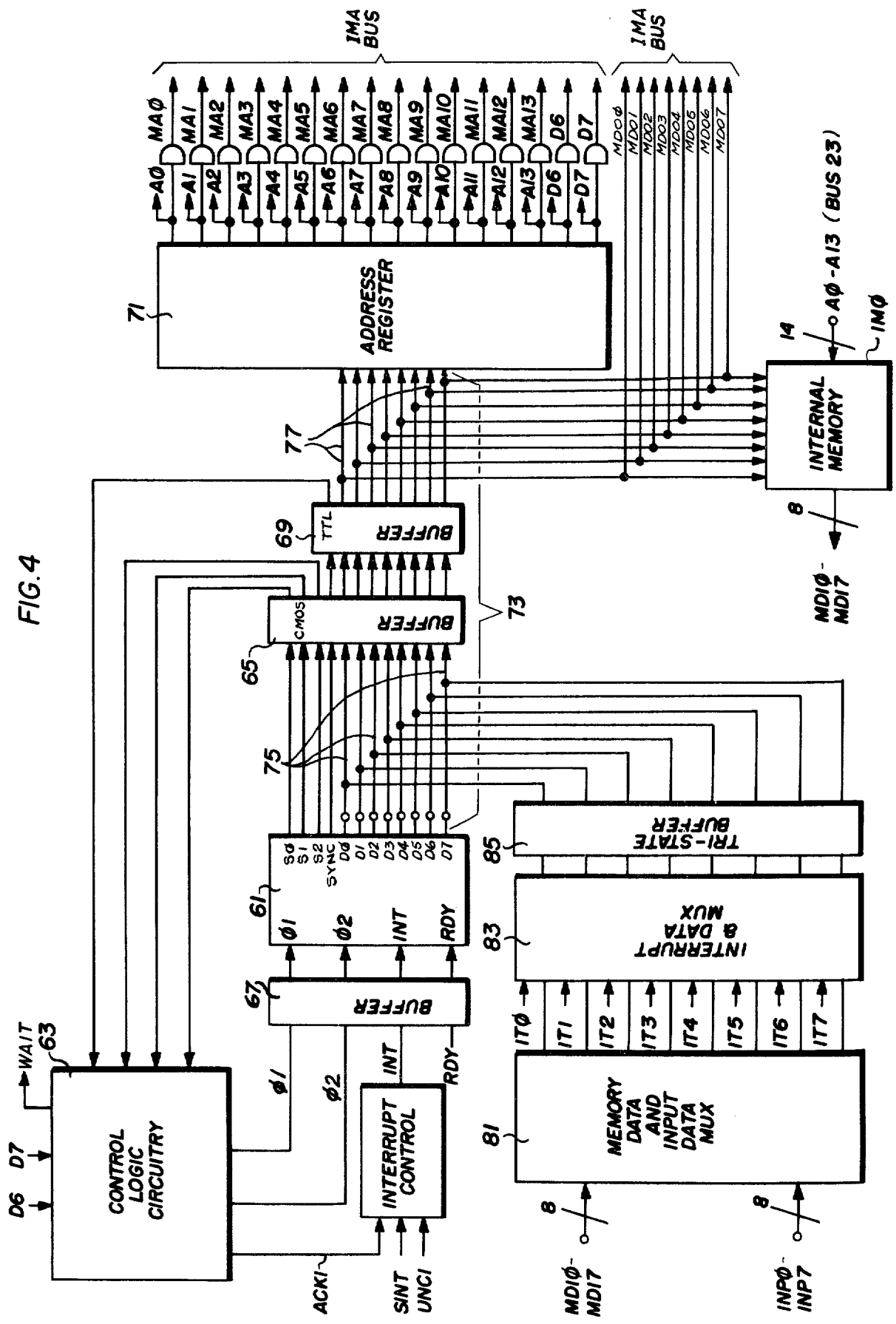
FIG. 4 is a combined schematic and block diagram illustrating a universal microprocessor module for implementing the expandable modular control system shown in FIG. 1.

With reference now to FIG. 4, there is shown a single "universal" microprocessor module which may be combined with other such microprocessor modules to implement the multiprocessing system in the expanded modular control system of the present invention. Although the microprocessor module hereinafter shown and described can be readily implemented with any of a number of commercially available microprocessor devices, in a working embodiment of the present invention, the Intel 8008-1 microprocessor device was utilized to illustrate the practical realization of the modular control system of the present invention. A more detailed description of the Intel 8008-1 microprocessor device is provided in 8008, 8-Bit Parallel Central Processor Unit, Users Manual published by Intel Corporation, Nov. 1972. It should be understood, however, that with only minor modifications, which will be apparent to one skilled in the art, other microprocessor devices may be equally well suited for incorporation in the microprocessor module.

In particular, the microprocessor module comprises a microprocessor device 61 having: (1) a program register which is incremented after each succeeding instruction in the control program has been executed to correspond to the memory address of the next instruction to be executed in the control program sequence; (2) an instruction register which is sequentially loaded with the instructions comprising the control program responsive to the program register being successively incremented to contain the corresponding memory addresses thereof; (3) an arithemetic-logic unit for processing data in accordance with the control program and including C, Z, S and P flip-flops for indicating the status of the flag bits; and (4) a local memory (as distinguished from the external and internal memories) comprising seven 8-bit registers including an accumulator for registering the data being operated upon in accordance with the instruction then contained in the instruction register, H and L registers which respectively contain the high- and low-order bits of an indirect memory address corresponding to data to be processed in accordance with the instruction, and four other registers for temporary storage of data while it is being processed.

Operationally, the microprocessor device 61 functions in response to control signals generated by control logic circuitry 63 associated therewith. In particular, the Intel 8008-1 microprocessor device may require one, two or three machine cycles to completely execute each instruction. The first cycle is always an instruction fetch (PCI) cycle while the second and third cycles are for data reading (PCR), data writing (PCW) or input/output (PCC). Each machine cycle, in turn, may comprise any number of eight states through which the microprocessor can be directed. At any particular time in the control program sequence, the operational state of the microprocessor device 61 is reflected by a 3-bit output status signal (S0, S1, S2) generated at corresponding outputs thereof to indicate the progress of the microprocessor device 61 in processing a particular instruction, i.e., whether the instruction is being fetched from the memory or is being executed or the like. The status signal (S0, S1, S2), in turn, is coupled through a CMOS buffer stage 65 to corresponding inputs of the control logic circuitry 63 which in response thereto generates the various internal and external control signals required for setting the proper operating conditions in the various devices comprising the microprocessor module.

The control logic circuitry 63 also includes clock means (not shown) for generating a pair of clock pulse signals, 01, and 02. Generally, during each state comprising a machine cycle, two 01 pulses and two 02 pulses are generated. The clock pulses, 01 and 02, are in turn, coupled through a TTL buffer 67 to corresponding inputs of the microprocessor device 61. The 01 and 02 clock signals control the timing of the microprocessor operations to synchronize the microprocessor device 61 with those operations being carried on by the other devices comprising the control system. Accordingly, a sync signal is also coupled from a corresponding output of microprocessor device 61 to the control logic circuitry 63 through the CMOS buffer 65 and a TTL buffer 69 to synchronize the control logic clock means with the microprocessor device 61 for synchronous operation of the control system in accordance with the control program.

The instructions comprising the control program are ordinarily executed in sequence as they occur in the program. Thus, in the present embodiment, the program register is incremented after each instruction in the program has been executed to correspond to the particular memory address of the next instruction in the program.

Thus, the memory address corresponding to the memory location of the next instruction in the control program is coupled from the input/output ports, D0-D7 of the microprocessor device 61 to the corresponding inputs of an address register 71 as a pair of 8-bit words by means of an internal address/data transfer bus, identified generally at 73. In particular, the internal address/data bus 73 comprises a bidirectional data bus 75 coupling the D0-D7 input/output ports of the microprocessor device 61 to the corresponding inputs of the CMOS buffer 65 which has the TTL buffer 69 coupled in tandem therewith. The CMOS and TTL buffers, 65 and 69, respectively, convert the signal level of the memory address output from the microprocessor device 61 to a level compatible for registry in the address register 71 via a buffered data bus 77. Accordingly, the two 8-bit words comprising the 14-bit memory address of the next instruction to be executed and the two control bits (D6 and D7) are sequentially loaded into the address register 71 which in the present embodiment, for example, comprises four 4-bit bistable latches, (e.g., Texas Instruments No. 7475).

In the present embodiment, the internal memory has a storage capacity of up to 8000 words of random access (RAM) and read-only (ROM) memory, each 8-bit word corresponding to a unique 14-bit memory address. Thus, the 14-bit memory address of the instruction is loaded into the address register 71 to specify the memory location of the next instruction to be loaded into the instruction register in the microprocessor device 61. Since only 14 bits are required to specify the memory address, the two remaining bits (D6 and D7) loaded into the address register 71 are utilized to indicate the machine in which the microprocessor module is operative. The D6 and D7 outputs of address register 71 are, in turn, coupled through buffers to the control logic circuitry 63 as inputs thereto. At other times, the D6 and D7 outputs are indicative that the microprocessor module is operative in one of the "memory read", "memory write", or "input/output" modes.

The memory address stored in address register 71 is, in turn, output through the address register output A0-A3 and coupled to the internal memory module (e.g., IM0) via internal data transfer bus 23 to address the corresponding memory location. The instruction stored at the addressed memory location is then coupled from the internal memory, IM0, to the memory data input ports, MDI0-MDI7, of a memory data and input data multiplexor 81 (e.g., dual Texas Instruments No. 74155 two-to-four line decoder/multiplexors), The TTL Data Book For Design Engineers, 1st edition, hereinafter "TTL Data Book".

In turn, the instruction from the internal memory, IM0, is coupled through the memory data and input data multiplexor 81 to the corresponding input terminals of an interrupt and data multiplexor 83 comprising quadrupled two-line-to-one-line data selector/multiplexor devices (e.g., Texas Instruments No. 74157, TTL Data Book). Thereafter, the pair of 8-bit words comprising the instruction are sequentially coupled from the interrupt and data multiplexor 83 to the input-/output ports, D0-D7, of microprocessor device 61 through a quadrupled bus buffer gate 85 with tri-state output (e.g., Texas Instruments No. 74125, TTL Data Book) couped to the bidirectional data bus 75 and loaded into the instruction register of microprocessor device 61.

Each instruction loaded into the microprocessor instruction register comprises an operation code (op code) for determining what operation the microprocessor device 61 is to perform and an operand code designating the address of the data which is to be operated upon in accordance with the op code. The operand code, in turn, is coupled from the instruction register and loaded into the H and L registers of the microprocessor device 61 to correspond to the address of the data to be processed. The address is then coupled from the input/output (D0-D7) ports of the microprocessor device 61 and loaded into the address register 71 via the internal address/data transfer bus 73.

Figure 5:
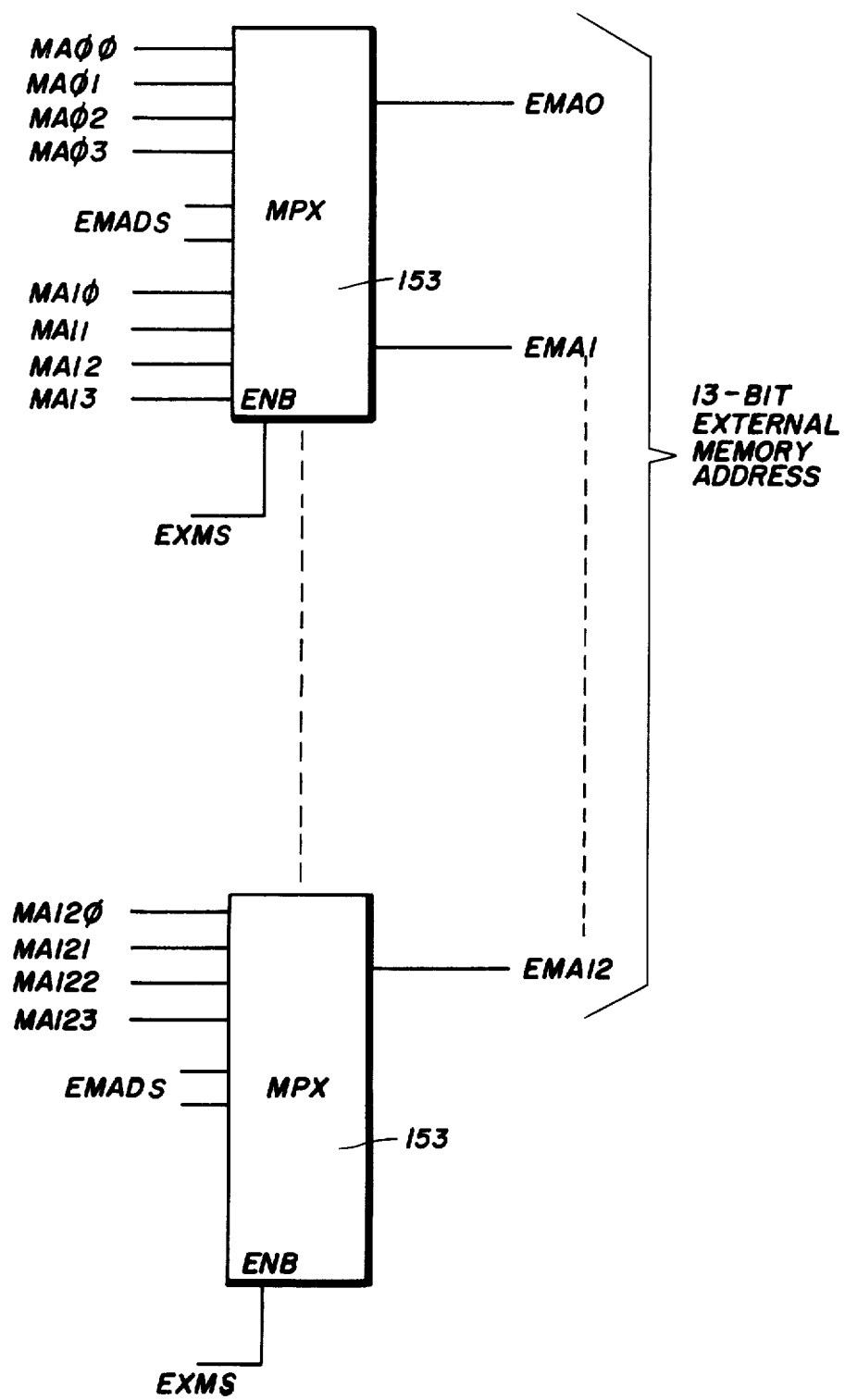
FIG. 5 illustrates a memory address multiplexor included in the bus assigner of the present invention.

If the address indicates that the data is to be read from the external memory module 13, the address is coupled from the buffered outputs, MA0-MA13, of the address register 71 to the bus assigner 27 over the Internal Memory Address bus (e.g., IMA0 in FIG. 2). When the bus assigner 27 assigns the External Memory Address bus 29 to the microprocessor, the address multiplexor shown in FIG. 5, which is included in the bus assigner 27, couples the memory address to the external memory module 13. The data stored at the location corresponding to the address is then coupled to the memory data input ports (MDI0-MDI7) of multiplexor 71 via the expanded External Data In bus 33 and coupled therethrough to the interrupt and data multiplexor 83 and ultimately to the input/output ports (D0-D7) of the microprocessor device 61 where it is loaded into the accumulator register therein.

After the arithmetic-logic unit of the microprocessor device 61 has processed the data in accordance with the instruction op code, the processed data may be output to an input/output device, written into a "permanent" storage location in the external memory 13 or temporarily stored in the internal memory, IM0, for subsequent processing after additional data has been processed.

If the processed data is to be permanently stored in the external memory module 13 or issued to either of the sense point or control point modules, 15 and 17, respectively, as a control word, subject of course to retrieval therefrom, the operand of the corresponding "store" instruction specifies the address at which the information is to be stored. Accordingly, once again the memory address is coupled to the address register 71 by means of the internal address/data transfer bus 73 and, in turn, coupled from the buffered MA0-MA13 outputs of register 71 to the bus assigner 27 via the expanded Internal Memory Address bus, IMA0 (FIG. 1). The processed data or control word is coupled to the MDO0-MDO7 output terminals of the microprocessor module via the internal address/data transfer bus 73 and an extension 77a of the buffered data bus 77. The processed data is then coupled over the expanded Internal Data Out bus MDO0 (FIG. 2) coupled to the MDO$\phi$-MDO7 terminals to the bus assigner 27.

Figure 6:
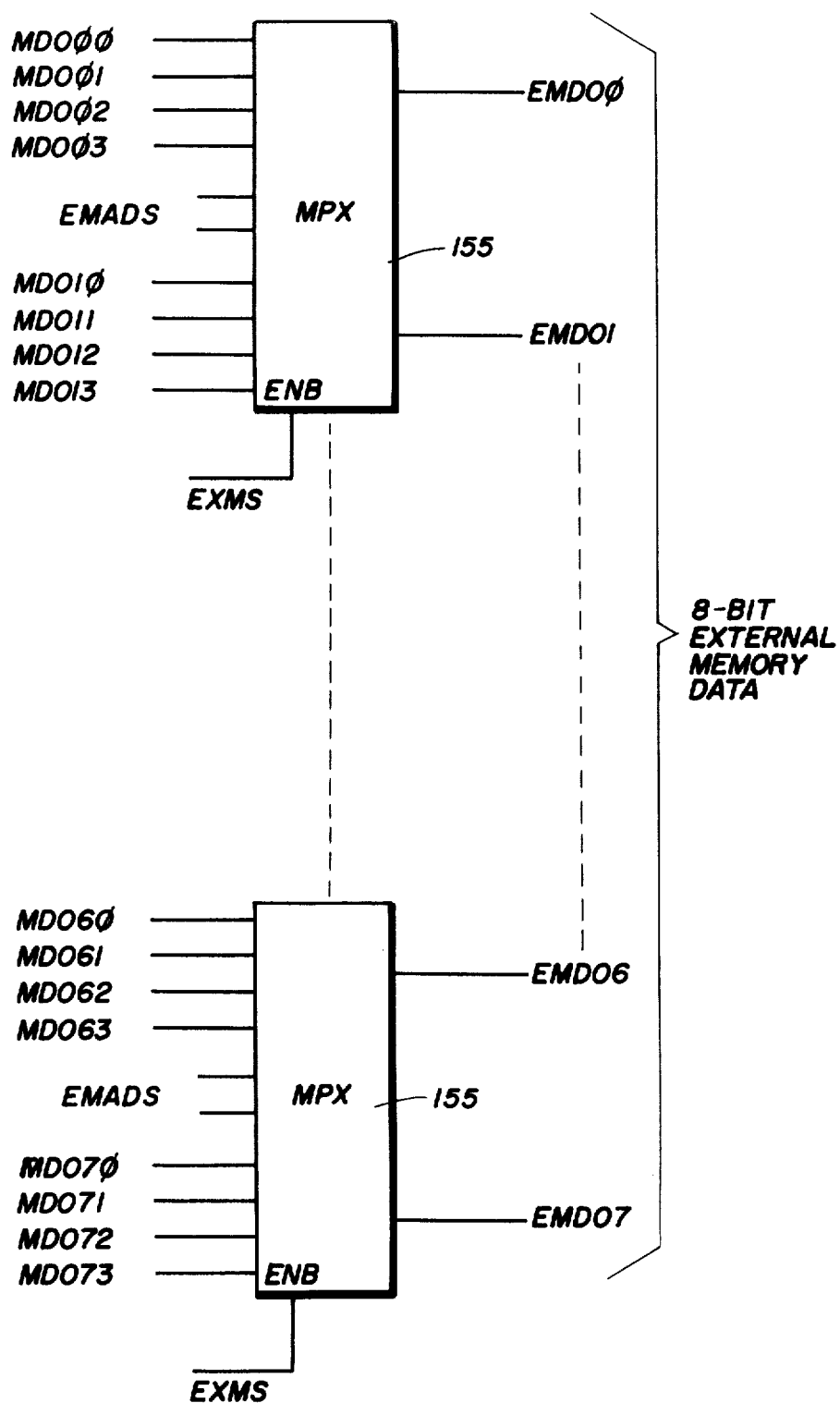
FIG. 6 illustrates a data multiplexor included in the bus assigner of the present invention.

When the bus assigner 27 assigns access to the microprocessor, the memory address is coupled through the address multiplexor (FIG. 5) to identify the memory location at which the data is to be stored, and the data is coupled through a data multiplexor (FIG. 6) in the bus assigner 27 to the external memory 13 over the External Memory Data Out bus 31 for storage in the addressed memory location.

FIGS. 7, 7A and 8 illustrates one embodiment of a bus assigner including apparatus for determining the existence of a request for access to the external memory by one or more of the microprocessor modules and apparatus for assigning access by the microprocessor modules to the system bus, and hence the external memory, on a priority basis The embodiment may be used with the multiprocessing system comprising a plurality of universal microprocessors such as the one described and shown in FIG. 4.

Referring particularly to FIG. 8, the bus assigner apparatus comprises a plurality of NAND gates 101, each gate 101 being associated with a corresponding one of the microprocessor modules, $\mu$Pr0, $\mu$Pr1, $\mu$Pr2, and $\mu$Pr3. Each NAND 101 has inputs PCI, T1, and 02 for monitoring for the 02 clock pulse of the T1 state of the processor control instruction fetch (PCI) machine cycle of the corresponding microprocessor module. The output of each NAND 101 is, in turn, coupled to an input of a corresponding flip-flop, identified generally at 103. The output of a NAND gate 105 coupled to the output of a flip-flop 103 is coupled to the RDY input of the microprocessor 61 (FIG. 4) of the corresponding microprocessor module.

During the T1 state of the PCI cycle, the lower eight bits of the 14-bit memory address corresponding to the address in the external memory 13 to which the microprocessor module seeks access are transferred to the address register 71 (FIG. 4) and the bus assigner apparatus is conditioned to receive the access request from the microprocessor module. Coincident with the occurrence of the 02 pulse, all three inputs, PCI which is derived from the D6 and D7 outputs, T1 which is derived from the S0-S2 outputs, and 02, to the NAND 101 are high ("1"). As a result, the flip-flop 103 is reset to drive the output of NAND gate 105 low ("0") thereby removing the READY signal from the RDY input of the corresponding microprocessor module. If the READY is still absent during the T2 state when the microprocessor 61 scans the RDY input, the microprocessor goes into the "wait" state. It will be understood, of course, that since the several microprocessor modules $\mu$Pr0, $\mu$Pr1, Pr2 and $\mu$Pr3 operate asynchronously, the RDY outputs of several microprocessor modules may be conditioned to wait at different times.

Subsequently, during the T2 state, the higher six bits of the memory address and the two control bits are output by the microprocessor device 61 (FIG. 4) and loaded into the address register 71. As previously described, the 14th bit of the memory address is reserved to request access to the external memory 13; that is, the MA13 output from the address register 71 is high ("1") when access to the external memory is requested. Before the remainder of the memory address is latched into the bistable latches comprising the address register 71, however, the second 8-bit word comprising the memory address is available at the MDO outputs of the microprocessor module (FIG. 4), the MDO5 output corresponding to the 14th bit of the memory address, i.e., the MA13 output of the address register 71. In operation, the request for external memory access (MDO5) is picked off early and coupled to the input of a corresponding inverter 107 which, in turn, is coupled to an input of a corresponding NAND gate 109.

If a particular microprocessor module does not seek access to the external memory, the resultant low (0) level MDO5 input to the corresponding inverter 107 is inverted and coupled to the corresponding input of the NAND gate 109. During the SYNC interval of the T2 state, the SYNC and T2 inputs to the NAND gate 109 are also high (1) so that the resultant low level output signal from NAND gate 109 resets the flip-flop 103 to again generate the READY signal at the output of NAND gate 105. Accordingly, the READY signal is applied to the RDY input of the corresponding microprocessor 61 (FIG. 4) until the apparatus is again conditioned to monitor for an external memory access request during the 02 interval of the T1 state of the PCI cycle, i.e., when NAND gate 101 again sets flip-flop 103 to remove the READY signal.

If, on the other hand, one of the microprocessor modules does require access to the external memory 13, the high (1) MDO5 input is converted to 0 by the corresponding inverter 107 and coupled to the NAND gate 109. Accordingly, NAND 109 does not reset flip-flop 103 during the SYNC interval of the T2 state, and the READY signal continues to be absent at the RDY input of the microprocessor.

At the end of the T2 state interval, the microprocessor 61 scans the RDY line input for the READY signal. If the READY signal is not detected, the microprocessor module generates a WAIT signal (FIG. 4) so that the microprocessor module 13 is held in the wait state. If the READY signal is detected, however, the microprocessor module proceeds to the next state in the machine cycle. Since the RDY input is scanned only at the end of the T2 state interval, a WAIT signal is not generated during the $\phi$2 interval of the T1 state of the PCI cycle when the READY signal is absent during the time the apparatus is conditioned to monitor for an access request.

The WAIT output line of each microprocessor module is coupled to the input of a corresponding one of a plurality of inverters 111, each having a corresponding output coupled to the input of a NAND gate 113. Similarly, the MA13 output of each microprocessor module is coupled through a corresponding inverter 115 to the inputs of a NAND gate 117. The outputs of NAND gates 113 and 117, in turn, are coupled to the inputs of a NAND gate 119 which is coupled to the input of a monostable multivibrator 121. Accordingly, if any of the microprocessor modules, μPr0, μPr1, μPr2 or μPr3, generates a WAIT signal, indicating that the microprocessor module requires access to the external memory, NAND gate 113 applies a high level (1) input to NAND gate 119. Since a WAIT signal can be generated for reasons other than a microprocessor module seeking access to the external memory, the NAND gate 119 does not trigger the monostable multivibrator 121 unless NAND gate 117 coincidentally applies a high level (1) signal to the other input of NAND gate 119 responsive to one of the inverters monitoring a request for access, i.e., MA13 = 1. 0, being triggered, the monostable multivibrator 121 generates a zero-going pulse at its Q output. The zero-going pulse sets a flip-flop, identified generally at 123, coupled to the $\overline{Q}$ line to generate a low level inhibit (IHB) output signal which is coupled back to corresponding inputs of the several NAND gates 109. The resulting high level (1) signals applied to the corresponding inputs of the several flip-flops 103 combines with the low level (0) signal, i.e., the zero-going pulse, applied from the $\overline{Q}$ output of monostable multivibrator 121 to the corresponding input on the other side of flip-flop 103, to cause the other flip-flops 103 be set, removing the READY signal from the RDY inputs of the other microprocessor modules. Accordingly, each microprocessor module generates a WAIT signal.

Referring now to FIG. 7A, when all of the microprocessor modules are in the WAIT condition as a result of a request for access to the external memory, an ALL WAIT (AWT) signal is generated by a monostable multivibrator 125. In particular, the WAIT line of each of the microprocessor modules, μPrφ, μPr1, μPr2 and μPr3, is coupled to a NAND gate 127 which is coupled through an inverter 129 to the monostable multivibrator 125. Responsive to the WAIT signals, the monostable multivibrator 125 is triggered, and the AWT signal is coupled to the corresponding inputs of a plurality of AND gates 131, one of which is associated with each of the microprocessor modules.

The other input to each of the AND gates 131 is coupled to the MA13 output of the corresponding microprocessor module. Accordingly, whenever one microprocessor module or two or more microprocessor modules simultaneously request access to the external memory 13, i.e., MA13 is high (1), each of the corresponding AND gates 131 triggers an edge-triggered flip-flop (ETDFF) 133 coupled to its output, driving the Q output of the corresponding flip-flop 133 high (1) and the $\overline{Q}$ line low (0). The Q output and $\overline{Q}$ output of the other flip-flops 133 remain 0 and 1, respectively.

The determination of priority for access of the external memory 13 by the microprocessor modules is accomplished by a logic network coupled to the Q and $\overline{Q}$ outputs of the several edge-triggered flip-flops 133. More particularly, the Q output line of each flip-flop 133 is coupled to the input of a corresponding NAND gate 135 while the $\overline{Q}$ line of each flip-flop 133 is coupled to the other input of each of the NAND gates 135 associated with the microprocessor modules having lower priorities. For example, the $\overline{Q}$ line of the ETDFF0 ("0") flip-flop 133 associated with microprocessor module μPr0 is coupled by intermediate logic to the NAND gates 135 coupled to the ETDFF1 (1), ETDFF2 (2) and ETDFF3 (3) flip-flops 133 associated with microprocessor modules μPr1, μPr2 and μPr3, respectively. Similarly, the $\overline{Q}$ line of the 1 flip-flop 133 is coupled to the NAND gates 135 associated with microprocessor modules μPr2 and μPr3, and the $\overline{Q}$ output of the 2 flip-flop 133 is coupled to the NAND gate 135 associated with microprocessor module μPr3.

The intermediate logic generally comprises a plurality of AND gates 137, 139 and 141, each coupled to the other input of a corresponding NAND gate 135. The AND gates 137, 139 and 141 monitor the $\overline{\text{SYNC}}$ line of the corresponding 1, 2 and 3 flip-flops 133, respectively. The other input to AND gate 137 is connected directly to the $\overline{Q}$ line of the 0 flip-flop 133 while a NAND gate 143 is interposed between the $\overline{Q}$ lines of the 0 and 1 flip-flops 133 and the input to AND gate 139. A NAND gate 145 having inputs coupled to the $\overline{Q}$ lines of the 0, 1 and 2 flip-flops 133 has an output coupled through an inverter 147 to the input of AND gate 141.

Operationally, if only one microprocessor module requests access, the NAND gate 135 associated therewith is triggered during the $\overline{\text{SYNC}}$ interval of the microprocessor module to generate a low level "pulse ready" (PRD) signal which, in turn, is coupled back to an input to the corresponding NAND gate 105 (FIG. 8). The PRD signal applied to NAND gate 105 pulses the gate to generate a READY signal allowing the microprocessor module to proceed with access to the external memory.

If, however, two or more microprocessor modules are simultaneously requesting access to the external memory, the higher priority microprocessor module is given access. More particularly, the low level (0) signal from the $\overline{Q}$ line of the higher priority microprocessor module is coupled through the intermediate logic associated with the lower priority microprocessor module(s) to apply a low level signal to the input of the corresponding NAND gate 135 thereby preventing generation of the PRD signal by the lower priority microprocessor module(s). After each microprocessor module requesting access has been given access to the external memory, the corresponding flip-flop 133 is reset during the T4 state interval via a NAND gate 149 coupled to the reset line of the flip-flop 133.

A NAND gate 151 having inputs coupled to the respective Q lines of the several flip-flops 133 generates an external memory select (EXMS) signal responsive to one or more of the microprocessor modules requesting access. The EXMS signal is maintained as long as one or more of the $\overline{Q}$ outputs is low (0). The EXMS signal is, in turn, coupled to the external memory address multiplexors 153 (FIG. 5) and the external memory data multiplexor 155 (FIG. 6), to enable the multiplexors 153 and 155. A 2-bit external memory address and data select (EMADS) signal is derived from the respective outputs of the flip-flops 133 associated with the several microprocessor modules μPr0, μPr1, μPr2 and μPr3 and coupled to the multiplexors 153 and 155 to selectively couple the memory address from the microprocessor module having priority to the external memory, the control point module or the sense point module and to selectively couple data between the microprocessor module and the external storage, e.g., the external memory. For example, one way to generate the EMADS signal would be to couple the $\overline{Q}$ line of the 0 flip-flop 133 to a pair of AND gates having respective outputs at which the EMADS signal is generated. The other input to one of the AND gates would be coupled directly to the 1 flip-flop 133 while the other input of the first AND gate would be coupled to the output of a NAND gate having inputs coupled to the $\overline{Q}$ line of the 1 flip-flop 133 and a second input coupled to an inverted $\overline{Q}$ output of the 2 flip-flop 133.

After each of the microprocessor modules has completed access, a set all ready (SARDY) signal is generated coincident with the first $\overline{SYNC}$ pulse generated by any of the microprocessor modules. In particular, the output of NAND 151 again goes low (0). An inverter 157 couples NAND 151 to a NAND gate 159 having the $\overline{IHB}$ signal generated by flip-flop 123 coupled to the other input thereof. The output of NAND 159 is coupled to the input of a NAND gate 161, the other input of which is coupled through an inverter 163 to the output of a NAND gate 165 having the $\overline{SYNC}$ signals of the several microprocessor modules coupled thereto through corresponding inverters 167. Accordingly, the SARDY signal is coupled to the flip-flops 103 to reset them. The SARDY signal is also coupled to a monostable multivibrator 169 to generate reset (RIHB) signal for resetting flip-flop 123.

During an external memory transfer any internal memory transfers of the other three microprocessors is deferred. This affects the processing capability of the system only slightly. For example, an average execution time for an 8008-1 CPU instruction is 20 μs. The approximate external memory cycle time is 2 μs. Therefore, the processing is slowed down by 10% per External Memory request. Statistically, however, the coincidence of internal memory requests by the non-requesting microprocessors with the requesting microprocessor for external memory microprocessor time slot is rather low. In addition, statistically, the external memory requests are projected to be small as compared to internal memory requests, although this may vary from application to application. As such, this mode of operation is estimated to have very little effect on the processing speed of the microprocessors in the system.

Accordingly, there has been shown and described a modular control system incorporating a multiprocessing system implemented by means of a plurality of microprocessor modules and having bus assigner means for selectively assigning the microprocessors access to the system buses and hence an external memory module.

While a particular embodiment of the present invention has been shown and described, it will be obvious to those skilled in the art that various changes and modifications can be made without departing from the invention in its broader aspects. Accordingly, the aim in the appended claims is to cover all such changes and modifications as may fall within the true spirit and scope of the invention.

What we claim is:

1. An expandable modular control system for controlling a second controlled system being monitored by said expandable modular control system comprising:
   means comprising a sense point module and a control point module, each of said modules comprising an array of memory devices corresponding to a plurality of $n$-bit words, each $n$-bit word having a corresponding memory address associated therewith,
   said sense point module being coupled to and monitoring said second system, said second system generating $n$-bit data words which are stored in said sense point module memory devices at assigned ones of said memory addresses responsive thereto,
   said control point module being coupled to and controlling said second system in accordance with n-bit control words stored in said control point module memory devices at assigned ones of said memory addresses;
   external modular memory means for storing said $n$-bit words at assigned memory addresses therein;
   multiprocessing means including a plurality of microprocessor modules for asynchronously processing said $n$-bit data words to generate said n-bit control words for controlling said second system;
   system bus means including extended memory address bus means and extended data transfer bus means intercoupling said multiprocessing means with said external modular memory means and said sense point and control point modules,
   said modular microprocessors selectively addressing said memory addresses in said modular external memory means and said sense point and control point modules via said extended memory address bus means to transfer said $n$-bit words therebetween via said extended data transfer bus means for processing by said multiprocessing means to control said second system; and
   bus assigner means including logic means assigning a priority of operation to each of said microprocessor modules for selectively assigning access to said system bus means to said microprocessor modules, each of said microprocessor modules having a different assigned priority, said bus assigner means assigning use of said system bus means to said microprocessor module having the highest priority whenever one or more of said microprocessor modules requests access to said external memory, said bus assigner means permitting transfer of said $n$-bit words between the selected one of said microprocessor modules having priority and the external modular memory means, the sense point module and the control point module.

2. Apparatus in accordance with claim 1 including input/output means comprising one or more input/output interface modules having corresponding input/output devices associated therewith for inputing $n$-bit words to said multiprocessing means via said system bus means under the control of said bus assigner means and for outputing processed $n$-bit words therefrom.

3. Apparatus in accordance with claim 2 wherein said system bus means includes extended input/output address bus means and extended input/output data transfer bus means intercoupling said input/output interface modules and said multiprocessing means for respectively addressing a particular one of said input/output interface modules and transferring n-bit data between said addressed input/output interface module and said multiprocessing means.

4. Apparatus in accordance with claim 1 wherein each of said microprocessor modules comprises a microprocessor device mounted on a printed circuit card.

* * * * *